July 10, 1951       J. P. WERZYN       2,560,200
CAMERA SUPPORTING FLOODLIGHT ASSEMBLY Filed March 4, 1947

INVENTOR.
JOSEPH P. WERZYN
BY
*McMorrow, Berman & Davidson*
ATTORNEYS

Patented July 10, 1951

2,560,200

UNITED STATES PATENT OFFICE 2,560,200

CAMERA SUPPORTING FLOODLIGHT ASSEMBLY

Joseph P. Werzyn, Jackson Heights, N. Y.

Application March 4, 1947, Serial No. 732,263

3 Claims. (Cl. 240—2)

This invention relates to improvements in illuminating apparatus and particularly to an improved lamp device for photographic illumination purposes. Various structures have been devised for photographic purposes and a few such structures are now in general use. The most common photographic lamp currently in use is a flash bulb type lamp adapted to be mounted on a camera and operated in synchronism with the camera shutter. Such a lamp, while suitable for a single exposure camera, is not suitable for use with a motion picture camera and even when used with a single exposure camera fails to provide the shadow contrast necessary to give a desirable depth and sharpness to photographs taken by such artificial illumination. Other lamp structures designed for this purpose have been found to be unduly expensive, so heavy and cumbersome that they are not readily portable, lacking in necessary adjustment, and not adapted for convenient use with a portable camera, particularly of the moving picture type which must be freely movable in order to properly maintain its moving subjects in the field of the camera lens and in proper focus.

It is among the objects of the present invention to provide an improved illuminating apparatus particularly adapted for use with portable moving picture cameras, which is simple and inexpensive in construction, light in weight, easily adjustable to provide desired illumination effects, and arranged to provide a suitable support for a camera so that the lamp device and the camera can be conveniently handled as a single unit.

Figure 1:
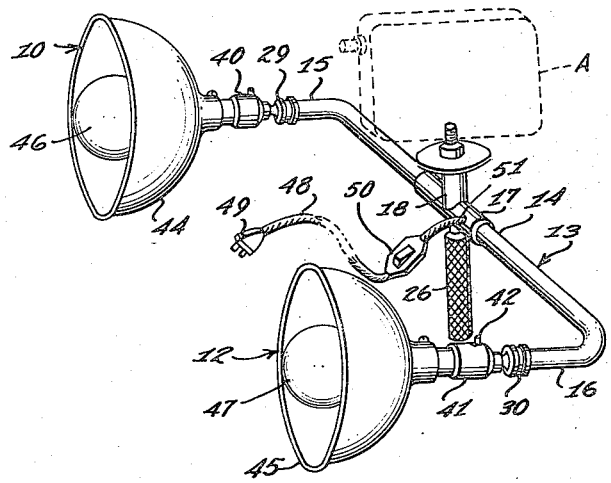
Figure 2:
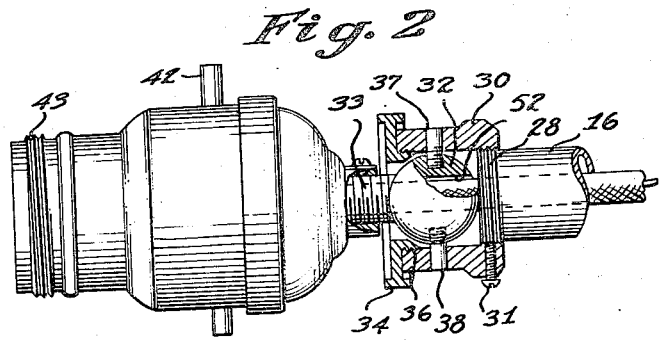
Figure 3:
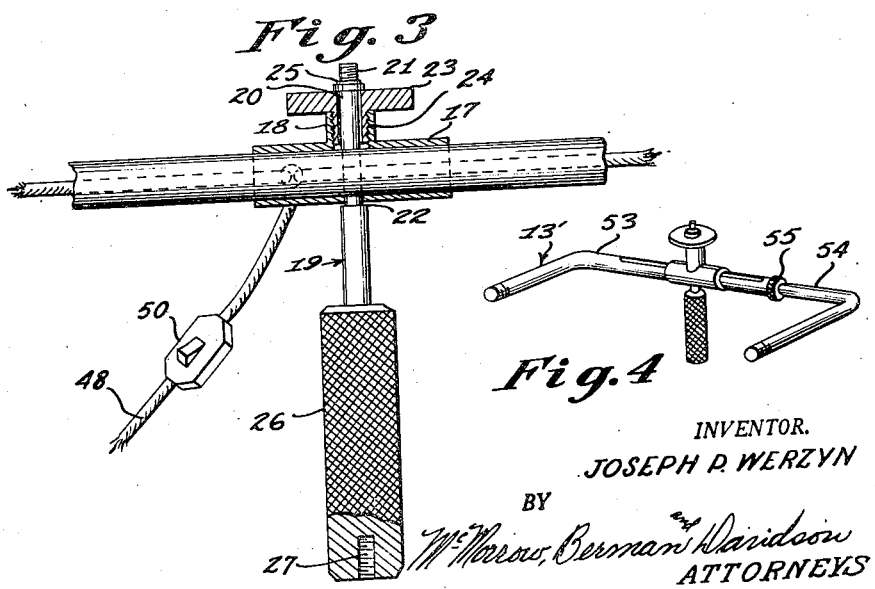
Figure 4:
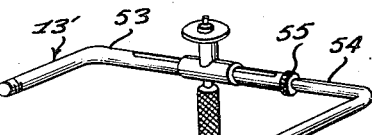

Other objects and advantages will become apparent from a consideration of the following description in conjunction with the accompanying drawing wherein:

Fig. 1 is a perspective view of photographic illuminating apparatus illustrative of the invention;

Fig. 2 a side elevational view on a somewhat enlarged scale of a fragmentary portion of the device shown in Fig. 1, portions being broken away and shown in section to better illustrate the construction thereof;

Fig. 3 an elevational view on an enlarged scale of a fragmentary portion of the center part of the device shown in Fig. 1 portions being broken away and shown in section to better illustrate the construction thereof; and Fig. 4 a perspective view on a reduced scale of a modified form of illuminating apparatus.

With continued reference to the drawing and particularly in Fig. 1, a pair of lamp units, as generally indicated at 10 and 12, are supported at the ends of a tubular supporting bar, generally indicated at 13. The bar 13 has a straight intermediate portion 14 and end portions 15 and 16 disposed substantially at right angles to the intermediate portion 14 with the center lines of the intermediate portion and the end portions lying substantially in a common plane.

The intermediate portion 14 of the bar 13 is received in a tubular cylindrical fitting 17 having at one side thereof a radially extending, internally screw-threaded boss 18. The tubular fitting 17 may be formed in two separable pieces to permit its assembling with the bar 13 or the bar may be passed through this tubular fitting before one of the end portions is bent to its right angular relationship to the intermediate portion of the bar.

A stem, generally indicated at 19, has a reduced portion 20 extending through the tubular fitting 17 and through the boss 18 provided on the tubular fitting and an externally screw-threaded end, as indicated at 21. At the end of the reduced portion 20 opposite the screw-threaded end 21 there is provided an annular shoulder 22 which bears against the adjacent side of the tubular fitting 17 to provide an abutment for the fitting on the stem 19. The reduced portion 20 of the stem extends through aligned apertures in the tubular fitting 17 and in the intermediate portion of the supporting bar 13 and through an apertured nut or camera table 23 having an externally screw-threaded sleeve portion 24 extending from one side thereof and threaded into the internally screw-threaded boss 18 provided on the fitting 17. A nut 25 is threaded onto the externally screw-threaded end portion 21 of the stem and bears against the adjacent surface of the camera table 23 to maintain the parts in assembled condition. The camera, as indicated at A in Fig. 1, may be threaded onto the upwardly projecting screw-threaded end portion 21 of the stem 19.

A cylindrical handle 26 is secured to the lower end of the stem 19 and extends downwardly therefrom, the lower end of this handle being provided with an internally screw-threaded well or bore 27 by means of which the lighting unit can be mounted on a tripod.

Each end of the lamp supporting bar 13 is externally screw-threaded, as indicated at 28 in Fig. 2, and a pair of cylindrical, internally screw-threaded socket sleeves are threaded, one on each end of the supporting bar and are locked in operative position thereon by suitable means, such as set screws, one of which is indicated at 31 in Fig. 2. Each socket sleeve receives a ball member, as indicated at 32 in Fig. 2, having a tubular, externally screw-threaded sleeve 33 extending outwardly therefrom through a locking-nut 34 screw-threaded into the end of the corresponding socket sleeve opposite the end of the sleeve secured to the corresponding end of the supporting bar 13. The nut 34 has a sleeve portion 36 threaded into the end of the sleeve member 30 and provides a shoulder overlying the ball 32, and engageable with the ball to lock the corresponding lamp unit in adjusted position relative to the supporting bar. The ball is held in operative relation to the sleeve member by a pair of oppositely disposed pivot pins 37 and 38 which limit movement of the bar relative to the socket sleeve 30 to an angular movement about the axis of these pins. A pair of lamp bulb-sockets 40 and 41 are secured one at each end of the supporting bar 13, each socket being secured to the corresponding sleeve such as the sleeve 33 extending from the ball 32. As these bulb-sockets are of commercial construction a detailed description thereof is considered unnecessary for the purpose of the present disclosure. Each socket, as illustrated in Fig. 2, has a snap switch 42 incorporated therein and is provided with an externally screw-threaded end portion 43 which receives the internally screw-threaded sleeve portion of a corresponding reflector, the two reflectors being indicated at 44 and 45 in Fig. 1.

Each bulb-socket receives a lamp bulb, the two bulbs being indicated at 46 and 47 in Fig. 1, and these bulbs may be of any desired character such as conventional electric light bulbs of sufficient illuminating capacity to provide the desired illumination or may be photo flood bulbs such as are now commercially available.

Electric energy is supplied to the bulbs 46 and 47 through a suitable cord 48 having at the end thereof a plug-in fitting 49 for connecting the cord with a conventional house type convenience outlet. A switch 50 is interposed in the cord 48 between the plug 49 and the light fixture to simultaneously control the electric current to both bulbs. Beyond the switch 50 from the plug 49 the cord is led through an aperture 51 in the tubular fitting 17 and the intermediate portion 14 of the supporting bar 13 to the interior of the supporting bar where it is divided to provide circuits to the two light bulb-sockets 40 and 41.

The electrical energy to the bulbs may be controlled by the switch 50 which controls the current to both bulbs simultaneously or the current to either of the light bulbs may be controlled by the corresponding snap switch 42 included in the bulb-socket so that either one of the bulbs can be used singly if desired. The balls which support the sockets 40 and 41 are provided with channels, as indicated at 52 in Fig. 2, through which the electric cord extends from the supporting bar 14 into the socket supporting sleeve, such as the sleeve 33 in Fig. 2.

The lamp units including the corresponding bulb-socket, reflector and light bulb are independently adjustable relative to the supporting bar 13 about the axis of the pivot pins 37 and 38, the axes of the pivot pins of each supporting socket being substantially vertical when the device is supported in operative position, and disposed substantially at right angles to the axes of the center portion 14 of the supporting bar 13. This provides an adjustment of the two lamp units independently of each other toward and away from a plane which includes the center line of the stem 19 and handle 26 and is disposed substantially at right angles to the center line of the intermediate portion 14 of the lamp supporting bar, to vary the intensity of the light on the subject being photographed and control the high lights and shadows on the subject in a manner to provide the desired depth and clarity of the photograph.

In the modified arrangement shown in Fig. 4 the construction is similar to that shown in Figs. 1, 2 and 3 and described above except that the lamp supporting bar, as generally indicated at 13 in Fig. 4, is made in two pieces, as indicated at 53 and 54. The part 54 has an external diametrical dimension substantially equal to the internal diametrical dimension of the part 53 so that the part 54 is telescopically received in the part 53. A binding nut 55 is screw threaded onto the end of the part 53 and is operative to lock the two parts 53 and 54 together in a desired position of adjustment. This construction provides for an additional adjustment of the lamp units 10 and 12 so that the distance between the lamp units can be changed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Portable illuminating apparatus comprising a handle by means of which said apparatus is supported in operative position; a stem extending from one end of said handle having an annular shoulder intermediate its length and external screw threads on the end portion thereof remote from said handle; a tubular fitting having an internally screw-threaded boss at one side thereof; a lamp supporting tubular bar extending through said fitting, said fitting and said bar being mounted on said stem so that said fitting bears upon said annular shoulder; a camera table surrounding said stem and having a sleeve portion threaded into said boss; a nut on said stem bearing against said camera table to clamp said fitting against said annular shoulder; a pair of lamp-bulb-sockets pivotally secured one to each end of said supporting bar; a pair of reflectors mounted one on each lamp-socket, and an electric current conduit extending through said supporting bar and the pivoted connections between said bar and said sockets to said sockets.

2. Illuminating apparatus comprising a supporting bar having an intermediate portion and end portions disposed substantially at right angles to the intermediate portion; a pair of lamp units, each including a bulb-socket and a reflector, carried by said supporting bar one at each end thereof; a pivotal connection between each lamp unit and the corresponding end of the supporting bar each comprising a ball-socket sleeve screw threaded onto the end of the bar, a ball in said ball-socket sleeve having an externally screw-threaded bulb-socket receiving sleeve extending through the end of the ball-socket sleeve remote from the end of the bar, and a lamp cord receiving channel in one side thereof communicating with the interior of said bulb-socket receiving sleeve, oppositely disposed pins pivotally connecting said ball to said ball-socket sleeve, and a ball locking nut screw threaded into the end of said ball-socket sleeve remote from the end of said supporting bar; a handle secured to the intermediate portion of said supporting bar; and a camera table carried by said handle.

3. Hand supported illuminating apparatus comprising a tubular supporting bar having an intermediate portion and end portions disposed substantially at right angles to said intermediate portion; a pair of lamp units, each including a bulb-socket and a reflector, pivotally connected, one to each end of said supporting bar; a tubular fitting on the intermediate portion of said bar having an internally screw-threaded boss extending from one side thereof; a handle having a stem extending from one end thereof and passing through registering apertures in said tubular fitting and said bar and through said tubular fitting boss, said stem having an externally screw-threaded outer end portion and, intermediate its length, a shoulder limiting its passage through said bar and said tubular fitting; a camera table having a central sleeve portion screw-threaded into said boss surrounding said stem; and a nut threaded onto said stem and bearing against said camera table to hold said handle in operative association with said supporting bar.

JOSEPH P. WERZYN.

REFERENCES CITED

The following references are of record in the file of this patent:

UNITED STATES PATENTS

| Number | Name | Date |
|---|---|---|
| 1,834,428 | Seitz | Dec. 1, 1931 |
| 2,107,074 | Hineline | Feb. 1, 1938 |
| 2,261,953 | Brown | Nov. 11, 1941 |
| 2,314,033 | Curran | Mar. 16, 1943 |
| 2,403,892 | McFarlane et al. | July 9, 1946 |
| 2,418,067 | Carpenter | Mar. 25, 1947 |

FOREIGN PATENTS

| Number | Country | Date |
|---|---|---|
| 373,360 | England | of 1932 |